(12) United States Patent
Kustra et al.

(10) Patent No.: US 6,214,237 B1
(45) Date of Patent: Apr. 10, 2001

(54) PROCESS FOR TREATING SOLID WASTE SLURRY

(75) Inventors: Raymond J. Kustra, North Huntingdon; Charles J. Weaver, Belle Vernon; Thomas L. Zimmerman, Jeannette; Jacob A. Vozel, Greensburg, all of PA (US)

(73) Assignee: Allegheny Energy Supply Company, Greensburg, PA (US)

( * ) Notice: Subject to any disclaimer, the term of this patent is extended or adjusted under 35 U.S.C. 154(b) by 0 days.

(21) Appl. No.: 09/342,466

(22) Filed: Jun. 29, 1999

(51) Int. Cl.[7] .................................................. B01D 21/01
(52) U.S. Cl. ........................ 210/709; 209/5; 210/710; 210/713; 210/738; 210/768; 210/787; 210/803; 210/804; 588/256
(58) Field of Search .................................. 209/5, 18, 465; 210/709, 710, 712, 713, 738, 787, 788, 803, 804, 805, 96.1, 195.1, 195.3, 197, 208, 522, 538, 540, 768; 588/256

(56) References Cited

U.S. PATENT DOCUMENTS

| | | |
|---|---|---|
| 2,381,760 | 8/1945 | Latham . |
| 2,781,910 | 2/1957 | Fontein . |
| 3,247,105 * | 4/1966 | Gustafson ............................ 210/208 |
| 3,788,469 | 1/1974 | Hirsch et al. . |
| 4,039,425 | 8/1977 | Neavel . |
| 4,090,955 * | 5/1978 | Dexter et al. ............................ 209/5 |
| 4,164,467 | 8/1979 | Liller . |
| 4,345,996 * | 8/1982 | Lindman et al. .................... 210/96.1 |
| 4,525,280 * | 6/1985 | Vasconcellos et al. ............... 210/728 |
| 4,571,301 | 2/1986 | Inskeep, Jr. . |
| 4,705,537 * | 11/1987 | Yaghmaie et al. .................... 210/727 |
| 4,879,048 | 11/1989 | Kreyenberg . |
| 4,909,950 | 3/1990 | Katoh et al. . |
| 5,108,626 | 4/1992 | Lees et al. . |
| 5,350,525 | 9/1994 | Shaw et al. . |
| 5,601,704 * | 2/1997 | Salem et al. ............................ 210/86 |
| 5,607,598 | 3/1997 | Williams . |
| 5,643,443 * | 7/1997 | Ishikura ............................... 210/113 |
| 5,800,717 * | 9/1998 | Ramsay et al. ....................... 210/711 |
| 5,843,315 * | 12/1998 | Baughn et al. ....................... 210/723 |

* cited by examiner

Primary Examiner—Peter A. Hruskoci
(74) Attorney, Agent, or Firm—Arnold B. Silverman; David C. Jenkins; Eckert Seamans Cherin & Mellott, LLC

(57) ABSTRACT

A process for the treatment of a solid waste slurry formed from solid waste particles mixed with a liquid includes delivering a solid waste slurry to a first solid-liquid separation means for separating a first amount of the solid waste particles from the slurry, followed by delivering the solid waste slurry from the first solid-liquid separation means to a tank where the solid waste slurry is stirred to maintain the solid waste particles in suspension. The solid waste slurry is then discharged from the tank with a portion of the solid waste slurry being recirculated back to the tank while a second portion of the solid waste slurry is delivered to a second solid-liquid separation means for separating a second amount of the particles from the slurry. Following discontinuation of the stirring of the slurry, the liquid is decanted from the tank at a level above a bottom area of the tank, followed by sampling of the liquid in order to determine the amount of solid waste particles contained in the solid waste slurry. The decanting and sampling may be performed at additional levels within the tank. An apparatus for treating a solid waste slurry formed from solid waste particles mixed with a liquid is also provided.

31 Claims, 1 Drawing Sheet

PROCESS FOR TREATING SOLID WASTE SLURRY

BACKGROUND OF THE INVENTION

1. Field of the Invention

The present invention relates to a process and apparatus for treating a solid waste slurry formed from solid waste particles mixed with a liquid.

2. Description of the Prior Art

Increased environmental awareness has resulted in more stringent laws regulating the disposal of various kinds of waste. For instance, numerous laws have been enacted both at the federal and state levels (as well as in many countries throughout the world) regulating the disposal of solid waste generated by many different types of industry.

One industry in particular that has had to deal with solid waste and the disposal thereof is the electric utility and power generation industry. Large quantities of solid waste are created during the power generation process, particularly in power generation processes utilizing fossil fuels, such as coal. One of the known ways for the electric utility and power generation industry to deal with such solid waste is to employ sedimentation ponds wherein a solid waste is deposited within the sedimentation ponds and allowed to settle over an extended period of time. The solid portion is then withdrawn and relocated to a suitable disposal site. However, the more stringent laws regulating the disposal of solid waste have made it more difficult for the electric utility and power generation industry to continue employing such disposal techniques. Still, there are numerous existing sedimentation ponds, and the use of such a technique by the electric utility and power generation industry continues to serve as a temporary solution to the solid waste disposal problem that ultimately must be addressed. Of course, the problem of eventually dealing with solid waste contained in sedimentation ponds is further complicated by the solid waste's admixture with the water contained in the sedimentation pond. Prior to properly disposing of the solid waste, it is necessary to remove or separate the solid waste from the water.

There do exist techniques for the treatment or processing of a water or slurry having solid waste materials admixed therewith. For example, generally known are waste water treatment facilities, such as those used by municipalities, that employ, among other equipment, centrifuges, thickeners, and water clarifiers. However, such facilities require large capital investments and include high operating expenses.

U.S. Pat. No. 3,788,469 discloses a process for removing ash generated during a power generation process from the precipitators. This process provides for removing fuel ash from the precipitator bottoms by circulating water through the bottoms of the precipitators to carry off the ash and then employing hydrocyclone separation to produce a major overflow fraction of reduced solids content and a minor overflow fraction of increased solids content.

U.S. Pat. No. 4,571,301 discloses a method and apparatus for cleaning chemical water solutions. A slurry is subjected to a combination of screening, hydrocyclone separation, and media filter separation in order to separate the particulate materials from the slurry.

U.S. Pat. No. 4,039,425 discloses a method for preparing a coal slurry substantially depleted in mineral-rich particles. This method employs an elutriation step for removing the mineral-rich particles and is directed primarily toward obtaining a slurry with particles of a uniform size.

U.S. Pat. No. 4,909,950 discloses a process and apparatus for separating solid-liquid compositions. Separation is achieved by employing one or more hydrocyclones in combination with a ceramic filtering process.

U.S. Pat. No. 2,381,760 discloses an apparatus and method for supplying clarified liquid. This process includes screen separation and hydrocyclone separation. The process is particularly adaptable for clarification of sea water.

There remains a need for a process and apparatus for treatment of a solid waste slurry formed from solid waste particles mixed with a liquid that is effective, reliable, and economically feasible, particularly for industries not primarily involved with water/solid waste treatment, such as the electric utility and power generation industry.

SUMMARY OF THE INVENTION

The present invention has met the above-described need. The invention includes a process for treatment of a solid waste slurry formed from solid waste particles mixed with a liquid, including the step of delivering the solid waste slurry to a first solid-liquid separation means for separating a first amount of the solid waste particles from the solid waste slurry. The process further includes the step of delivering the solid waste slurry from the first solid-liquid separation means to a tank and stirring the solid waste slurry contained within the tank to maintain the solid waste particles in suspension. Next, the process provides for discharging the solid waste slurry from the tank and into a pumping means and then recirculating by the pumping means a first portion of the solid waste slurry back to the tank. The process also provides for the step of discontinuing the stirring of the solid waste slurry within the tank and allowing the solid waste particles to settle to a bottom area of the tank. Next, decanting of the liquid from the tank is performed at a level above the bottom area of the tank, followed by sampling of the liquid decanted from the tank in order to determine the amount of solid waste particles contained in the solid waste slurry on a weight percent basis.

The process may also include the step of delivering by the pumping means a second portion of the solid waste slurry to second solid-liquid separation means for separating a second amount of the solid waste particles from the solid waste slurry. Alternatively, the process may include delivering by the pumping means a second portion of the solid waste slurry for mixing with a combustion ash.

The process may also include the additional steps of decanting the liquid from the tank at additional levels above the bottom area of the tank and further sampling the liquid decanted from the additional levels of the tank in order to determine the amount of solid waste particles contained in the solid waste slurry on a weight percent basis. In addition, the process may include the step of adding a coagulant aid to the slurry to concentrate the solid waste particles.

Alternatively, the process may provide for allowing the solid waste particles to settle to a bottom area of the tank, decanting the liquid from the tank at a level above the bottom area of the tank, followed by sampling the liquid decanted from the tank to determine the amount of solid waste particles contained in the solid waste slurry on a weight percent basis prior to stirring the solid waste slurry and discharging the same from the tank into a pumping means, as described herein. This allows for the amount of solid waste particles contained in the solid waste slurry to be determined at an early stage of the process.

The invention also includes an apparatus for treating a solid waste slurry formed from solid waste particles mixed with a liquid, where the apparatus comprises first solid-liquid separation means for separating a first amount of the solid waste particles from the solid waste slurry. The apparatus further comprises a tank for receiving the solid waste slurry, where the tank is in communication with the first solid-liquid separation means. The tank includes a discharge opening adjacent to a bottom area of the tank. The apparatus also comprises means for stirring the solid waste slurry contained in the tank, means for decanting the liquid from the tank at a level above the bottom area of the tank, and means for recirculating a first portion of the solid waste slurry discharged through the discharge opening of the tank back to the tank.

The apparatus may further comprise second solid-liquid separation means for receiving a second portion of the solid waste slurry discharged through the discharge opening of the tank for separating a second amount of the solid waste particles from the solid waste slurry.

The apparatus may further include means for sampling and testing the liquid decanted from the tank to determine the amount of solid waste particles contained in the solid waste slurry on a weight percent basis. In addition, the apparatus may further include additional means for decanting the liquid from the tank at additional levels above the bottom area of the tank and additional means for sampling the liquid decanted by the additional means for decanting to determine the amount of solid waste particles contained in the solid waste slurry on a weight percent basis.

It is an object of the invention to provide a process for treatment of a solid waste slurry with varying densities formed from solid waste particles mixed with a liquid.

It is an object of the invention to provide an apparatus for treating a solid waste slurry formed from solid waste particles mixed with a liquid.

It is further an object of the invention to treat a solid waste slurry to effectively separate solid waste particles from a liquid in order that the solid waste particles may be properly disposed.

It is also an object of the invention to effectively treat a solid waste slurry in order to separate solid waste particles from a liquid in order that the liquid may be used for producing additional solid waste slurry.

It is yet another object of the invention to treat a solid waste slurry in a combined system capable of separation of solid waste particles from a liquid and sampling of the liquid in order to determine the amount of solid waste particles contained in the solid waste slurry.

It is further an object of the invention to treat a solid waste slurry utilizing a tank having storage, separation, decanting, recirculating, and sampling capabilities.

It is yet another object of the invention to provide a process and apparatus for treatment of a solid waste slurry formed from solid waste particles mixed with a liquid, where the concentrated solid waste particles are mixed with a combustion ash to produce a stable transportable product.

It is yet another object of the invention to provide a process and apparatus for treatment of a solid waste slurry formed from solid waste particles mixed with a liquid, to prevent line pluggage and to minimize external liquid additions to the maximum practical extent.

It is another object of the invention to provide a process and apparatus for treatment of a solid waste slurry formed from solid waste particles mixed with a liquid in a cost-effective and economically feasible manner.

It is yet another object of the invention to provide a process and apparatus for treatment of a solid waste slurry formed from solid waste particles mixed with a liquid, where the solid waste particles are a byproduct of a power generation process.

It is yet another object of the invention to provide a process and apparatus for treatment of a solid waste slurry formed from solid waste particles mixed with a liquid that can be employed efficiently by the electric utility and power generation industry, where it is desirable to separate the solid waste particles from the solid waste slurry in order to conform to pertinent environmental laws and regulations.

These and other objects of the invention will be more fully understood from the following description of the invention with reference to the drawing appended hereto.

DESCRIPTION OF THE PREFERRED EMBODIMENTS

Figure 1:
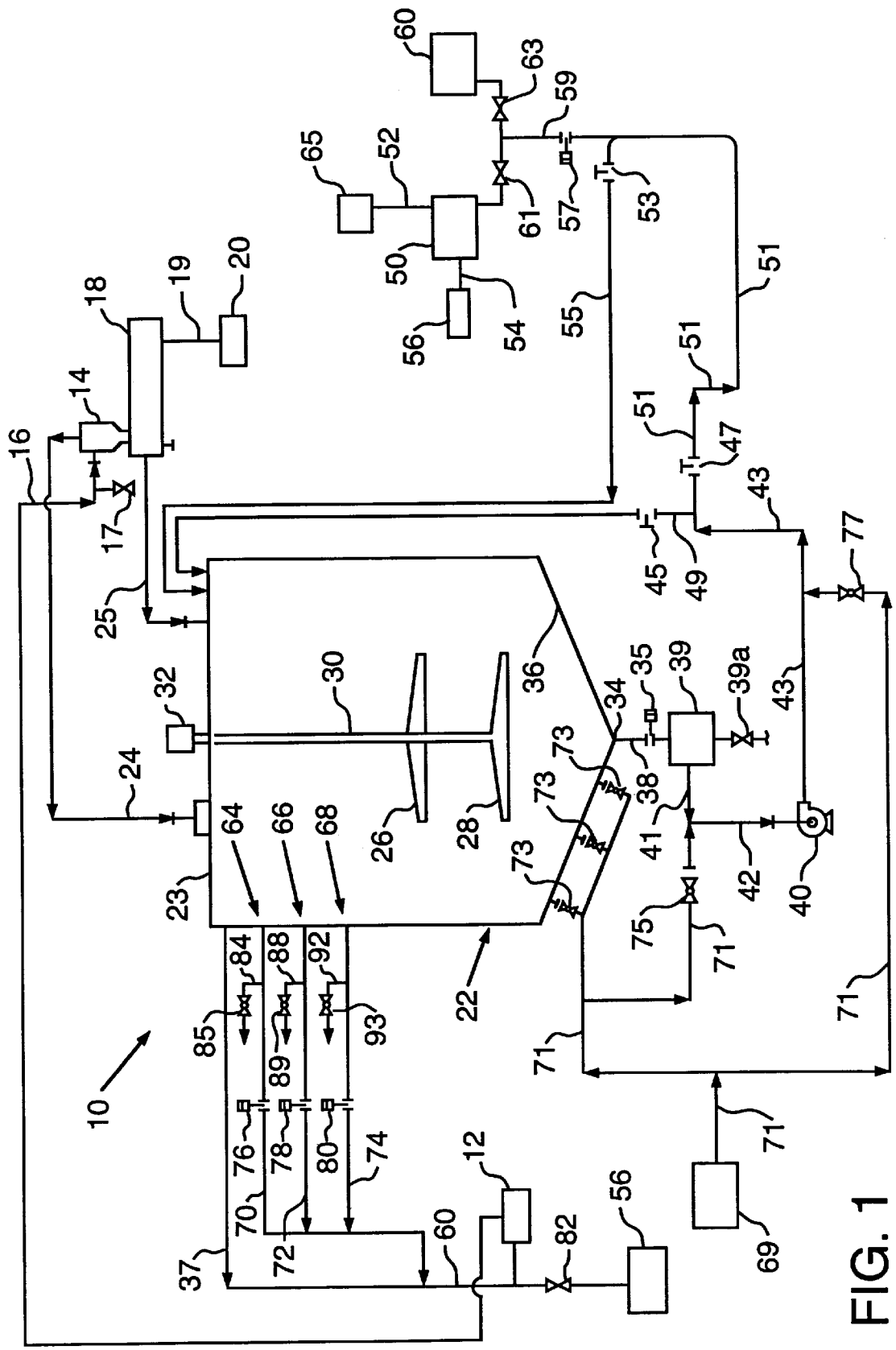
FIG. 1 is a schematic illustration of the invention.

With reference to FIG. 1, there is shown an apparatus 10 of the invention for treating a solid waste slurry formed from solid waste particles mixed with a liquid. While the apparatus 10 of the invention may be utilized to treat any number of different solid waste slurries having solid waste particles mixed with a liquid, it is particularly useful in the treatment of a solid waste slurry formed from solid waste particles mixed with a liquid where the solid waste particles are a byproduct or a waste component of a power generation process, such as, for example, combustion ash (where combustion ash may include flyash, bottom ash or combinations thereof). Such an apparatus is beneficial to the electric utility and power generation industry, where it is desirable to separate the solid waste particles from the solid waste slurry in order to conform to pertinent environmental laws and regulations relating to solid waste disposal.

Still referring to FIG. 1, for illustration purposes the invention will be described in the context of treating a solid waste slurry, where the slurry is contained in a sedimentation pond 12 and the solid waste particles mixed with a liquid to form the slurry contained in the sedimentation pond 12 are a byproduct or waste component of the power generation process. The use of sedimentation ponds by the electric utility and power generation industry is a generally known technique for dealing with solid waste materials that are produced in that industry. It should be appreciated that, while for purposes of illustration only the invention will be described in the context of utilizing a solid waste slurry contained in a sedimentation pond, other types of solid waste slurry that may be produced during a power generation process, as well as other processes in use in other industries, would be suitable for use with the invention.

With further reference to FIG. 1, the apparatus also includes a first solidliquid separation means, such as preferably a hydrocyclone 14 or alternatively a centrifuge. Such a hydrocyclone 14 is generally known and may include, for example, a Warman Cyclone Series C Model 15CS. The solid waste slurry is delivered from the sedimentation pond 12 via line 16 to the hydrocyclone 14 for separating a first amount of the solid waste particles from the solid waste slurry. The volumetric flow rate of the solid waste slurry delivered via line 16 to the hydrocyclone 14 is preferably in the range of 350 to 500 gallons per minute. This ensures that an adequate amount of solid waste slurry is being fed to the hydrocyclone 14. In addition, the solid waste slurry delivered from the sedimentation pond 12 to the hydrocyclone 14 preferably comprises the solid waste particles in the range of 5 to 40 weight percent of the solid waste slurry. The size of the solid waste particles in the solid waste slurry delivered to the hydrocyclone 14 is in the range of 15 microns to 1.5 inches.

Once the solid waste slurry is delivered via line 16 to the hydrocyclone 14, a predetermined amount of the solid waste particles are separated from the slurry in a manner that is generally known. Preferably, the size of the first amount of the solid waste particles separated in the hydrocyclone 14 is greater than 1/16 inch. Therefore, it will be appreciated that the hydrocyclone 14 provides means for separating a first amount of the solid waste particles contained in the solid waste slurry, prior to the solid waste slurry's being further processed, as will be described herein.

The hydrocyclone 14 preferably operates in a conventional manner to separate the solid waste particles based on weight and centrifuged action. The solid waste particles separated in the hydrocyclone 14 emerge therefrom and are passed through a settling chamber/screw classifier 18 where the larger particles are conveyed by line 19 to storage bin 20 for proper disposal at a later time.

It will be appreciated that while the invention thus far has been described where a solid waste slurry is delivered from a sedimentation pond 12 via line 16 to a hydrocyclone 14, other means may be employed for delivering a solid waste slurry to the hydrocyclone 14. For example, a conveyor system, not shown, may be employed to deliver the solid waste slurry contained in the pond 12 or being contained in other storage means directly to the hydrocyclone 14.

The solid waste slurry that passes through the hydrocyclone 14 is then delivered from the hydrocyclone to a tank 22 via line 24. Preferably, the volumetric flow rate of the solid waste slurry delivered to the tank 22 from the hydrocyclone 14 is in the range of about 350 to 500 gallons per minute. The overflow from the settling chamber/screw classifier 18 is also delivered via line 25 to the tank 22 for further processing.

The tank 22 is preferably constructed of carbon steel, although it will be appreciated that other suitable materials may be used to construct the tank 22. The tank 22 preferably has a volume in the range of about 60,000 to 90,000 gallons. In addition, the tank 22 preferably has an open top 23. Also, the tank 22 preferably has an interior coating to provide for corrosion protection. Furthermore, a bottom area 36 of the tank 22 is preferably cone shaped and provided with back flush capabilities to prevent pluggage in the bottom area 36 of the tank 22, as will be described in more detail.

Other features of the tank 22 which may be employed include constructing the tank such that space is provided beneath the tank to house ancillary equipment and control panels for the apparatus 10. In addition, the tank may have integral structural support capabilities for supporting the hydrocyclone 14 and the settling chamber/screw classifier 18 at an area adjacent the top of the tank. In addition, stair access may be provided for the top of the tank. In addition, a tank overflow line 37 may be provided to prevent spillage from the open top 23 construction of the tank. Tank baffles, not shown, may also be provided in the tank 22.

Coagulant aids, which include, for example, cationic, anionic, or nonanionic polymers, may be added to the solid waste slurry to increase the waste slurry density. The addition of the coagulant aids allows for further concentration of the solid waste particles contained in the solid waste slurry. The coagulant aids may be added, for example, to the solid waste slurry by injecting the coagulant aids directly into line 16 using valve 17, which may be for example a gate valve, or the coagulant aids may be inserted directly into the tank 22 via the open top 23. Of course, the coagulant aids may be mixed with the solid waste slurry at other convenient locations throughout the described process.

The tank 22 includes a means for stirring the solid waste slurry contained in the tank 22. The means for stirring may include, for example, mixing elements 26 and 28, which are connected by shaft member 30 to a motor 32 for rotating the mixing elements 26 and 28. By stirring or agitating the solid waste slurry contained in the tank 22, the solid waste particles contained in the slurry are maintained in suspension. The solid waste particles are preferably kept in suspension to prevent long term settling and compaction of the solid waste particles in the tank to prevent pluggage. It will be appreciated that means other than that shown or described herein may be employed to stir or agitate the solid waste slurry to keep the particles in suspension.

The tank 22 also includes a discharge opening 34 adjacent to the bottom area 36 of the tank 22. If the discharge opening 34 is closed by shutting off valve 35, which may be for example a knife gate valve with operator, and the mixing elements 26 and 28 are not in operation, the solid waste particles contained in the solid waste slurry will collect, due to gravity, at the bottom area 36 of the tank 22. This allows for the solid waste particles to be separated from the liquid that makes up the solid waste slurry in order that the liquid may be decanted from the tank 22, as will be explained in more detail herein.

If the discharge opening 34 of the tank 22 is open by opening valve 35, then the solid waste slurry is discharged from the tank 22 via line 38. The solid waste slurry is passed through a collection chamber 39 prior to being delivered via lines 41 and 42 to a pump 40. The collection chamber 39 is inserted prior to the pump suction lines 41 and 42 to prevent large/high density materials from entering the pump suction. The collection chamber 39 includes an outlet valve 39a, which may be for example a gate valve, for removing all material collected in the chamber 39.

An example of a pump 40 for use with the invention is an ESSCO Model 4×16 abrasion resistant vortex type pump with a capacity to match process requirements, typically 300–500 gallons per minutes.

The pump 40 pumps the solid waste slurry into line 43 where valves 45 and 47, which may be for example knife gate valves, are used to control flow into lines 49 and 51, respectively. Flow may be diverted into line 49, which provides the ability to recirculate the solid waste slurry to the tank 22 in a continuous manner. This may be done, for example, to keep the solid waste slurry moving at all times, or in the event, for example, the mixing elements 26 and 28 are rendered inoperable.

Alternatively, pump 40 may pump the solid waste slurry through line 43 with all or part of the solid waste slurry being diverted into line 51. The solid waste slurry in line 51 may in turn be diverted by valve 53, which may be for example a knife gate valve, such that all or part of the solid waste slurry contained in line 51 may be recirculated via line 55 back to the tank 22. Therefore, it will be appreciated that the pump 40 is capable of recirculating a first portion of the solid waste slurry via lines 49, 51 and 55 with various arrangements and combinations of flow within these lines being provided depending upon the particular circumstances and the process presently being carried out by the apparatus 10.

Valve 57 is provided for diverting flow of the solid waste slurry from line 51 into line 59. This second portion of the solid waste slurry is then delivered via line 59 for further processing. Valves 61 and 63 are provided for controlling the flow direction depending upon the type of further processing of the solid waste slurry, as will be described herein.

Valve 61 allows for the solid waste slurry to be delivered to a second solidliquid separation means, such as, for example, centrifuge 50, for separating a second amount of the solid waste particles from the solid waste slurry. An example of a suitable centrifuge 50 for use with the invention is a Sharples solid bowl centrifuge Model PM-75000 Super-D-Canter. It will be appreciated that other solid-liquid separation means, such as a hydrocyclone, may be used in place of the centrifuge 50 for separating a second amount of the solid waste particles from the solid waste slurry. Preferably, the size of the second amount of the solid waste particles separated in the centrifuge 50 is preferably greater than 15 microns. Additionally it is preferable that the solids in the centrate be less than 1 percent by weight.

The centrifuge 50 operates in a manner that is generally known in order to separate the second amount of the solid waste particles from the solid waste slurry. The solid waste particles that are separated using the centrifuge 50 are then delivered via line 52 to a storage bin 65 for disposal. The solid waste slurry that is discharged from the centrifuge 50, and at this stage of the process is substantially depleted of solid waste particles, is delivered via line 54 to a sump 56. From the sump 56, the solid waste slurry may be, for example, delivered back to the sedimentation pond 12 (not shown). As can be appreciated, this arrangement would provide for recirculation of the solid waste slurry back to the sedimentation pond 12 in order to provide a liquid to be mixed with additional solid waste particles to develop additional solid waste slurry for treatment. By providing for a closed-loop system where the solid waste slurry is circulated through the various components discussed herein with the solid waste particles separated therefrom and the liquid being continuously circulated, the process and apparatus of the invention provides for an environmentally friendly solution for the treatment and disposal of solid waste materials, while making advantageous use and reuse of the liquid used to form the solid waste slurry having the solid waste particles contained therein.

Alternatively, valve 61 may be closed and valve 63 opened in order to divert flow of the solid waste slurry to a flyash mixer/unloader 60. The mixer/unloader 60 provides a means for mixing the solid waste slurry with a combustion ash, such as flyash or bottom ash, prior to disposal of the combustion ash. The slurry, which at this point of the process still contains liquid mixed therewith, provides an effective means for dust control of the combustion ash to be disposed. The flyash/mixer unloader 60 may be, for example, a WRC Industrial Sales Unit with a 150 ton per hour rating which may include two parallel 20 inch auger/mixers and be equipped with a variable speed drive system. The solid waste slurry may be mixed with dry flyash from a storage silo to produce a conditioned dustless truckable product.

Still referring to FIG. 1, the tank 22 also includes means for decanting the liquid from the tank 22 at a level above the bottom area 36 of the tank 22 and means for sampling the liquid decanted from the tank 22 to determine the amount of solid waste particles contained in the solid waste slurry on a weight percent basis. More specifically, once the tank 22 contains a sufficient amount of the slurry, the discharge opening 34 is closed and the mixing elements 26 and 28 are discontinued from stirring the slurry. This allows for the solid waste particles remaining in the slurry to gravitationally settle in the bottom area 36 of the tank 22. The liquid may then be decanted from the tank 22 and, as stated, sampled to determine the amount of solid waste particles contained therein.

As illustrated in FIG. 1, the tank 22 includes a first decanting means, generally designated by the reference numeral 64, a second decanting means 66, and a third decanting means 68. It will be appreciated that additional decanting means may be provided in accordance with the invention. As illustrated, the first decanting means 64 is at an elevation above the bottom area 36 of the tank 22. The second decanting means 66 is at an elevation below the first decanting means 64, and similarly, the third decanting means 68 is at an elevation below the first decanting means 64 and the second decanting means 66. Advantageously, this allows for the decanting to begin at a higher elevation within the tank 22 in order to determine the amount of solid waste particles contained in the liquid at a particular level prior to moving to the next elevation level in order to sample and decant the liquid in a similar manner. It will be appreciated that the decanting means 64, 66, and 68 are, preferably, essentially identical to one another.

The first decanting means 64 includes a discharge line 70 for decanting the liquid from the tank 22. Similarly, the second decanting means 66 includes discharge line 72 and the third decanting means 68 includes discharge line 74. Valves 76, 78, and 80 are respectively provided for controlling the decanting action from the tank 22.

Referring specifically to the first decanting means 64, with the valve 76 in an open position the liquid is decanted from the tank 22 via discharge line 70. The liquid may then continue into line 60 for delivery back to the sedimentation pond 12. Similarly, when the liquid is decanted from the tank 22 via lines 72 and 74, opening of the valves 78 and 80, respectively, will allow for the liquid to flow into line 60 for delivery back to the sedimentation pond 12. Of course, it will be appreciated that opening of valve 82 in line 60 will allow for a predetermined amount of the liquid to flow into a sump 56.

The discharge lines 70, 72 and 74 each include a sampling line 84, 88 and 92, respectively, branching therefrom. Sampling line 84 includes a sampling valve 85, which may be for example a ball valve, to allow for a sample of the liquid contained in line 70 to be obtained in order to determine the amount of solid waste particles contained in the solid waste slurry, preferably on a weight percent basis. Similarly, sampling line 88 includes a sampling valve 89 and sampling line 92 includes a sampling valve 93. Of course, it will be appreciated that the sampling valves 85, 89 and 93 may be utilized when the valves 76, 78 and 80, respectively, are in the open or closed position.

The liquid sample that is obtained from the sampling valves 85, 89 and 93 is then tested to determine the amount of solid waste particles contained in the solid waste slurry. Preferably, the size of the solid waste particles contained in the decanted liquid is in the range of about 15 to 75 microns. This may be done in numerous ways. For example, an operator may make a visual examination of the liquid to determine the amount of solid waste particles contained therein. Alternatively, the liquid may be taken to a laboratory for more extensive testing, in a manner that is generally known. Advantageously, the amount of solid waste particles contained in the solid waste slurry is determined in order to ensure that an adequate amount of the particles have been removed prior to the liquid being returned to the sedimentation pond 12, or sump 56. Additionally, particle settling tests may be performed to determine the appropriate tank settling time necessary prior to the decanting process.

In operation of the apparatus 10 of the invention, the process for treatment of the solid waste slurry formed from solid waste particles mixed with a liquid includes the step of delivering the solid waste slurry from, for example, the sedimentation pond 12 to the hydrocyclone 14 for separating the first amount of the solid waste particles from the slurry. The solid waste particles separated within the hydrocyclone 14 are then delivered to the settling chamber/screw classifier 18 and then by line 19 to storage bin 20 for disposal of the solid waste particles in accordance with relevant solid waste disposal laws. The remaining solid waste slurry is then delivered from the hydrocyclone 14 via line 24, or from chamber 18 via line 25, to the tank 22. Mixing elements 26 and 28 are employed for stirring the solid waste slurry contained within the tank 22 to maintain the solid waste particles in suspension. With the discharge opening 34 in an open position, the solid waste slurry is discharged through the discharge opening 34 and into line 38 and through collection chamber 39.

The process then includes pump 40 recirculating a first portion of the solid waste slurry back to the tank 22 via line 49 or line 55. Pump 40 also delivers a second portion of the solid waste slurry, if desired, to line 59 for further separation in the centrifuge 50 or for mixing with a combustion ash in the mixer/unloader 60.

The process then includes the step of discontinuing the stirring of the solid waste slurry within the tank 22 and allowing the solid waste particles to settle to the bottom area 36 of the tank 22. This is followed by the decanting of the liquid from the tank 22 at various levels above the bottom area 36 of the tank 22, utilizing first decanting means 64, second decanting means 66, and third decanting means 68. The decanted liquid is then sampled to determine the amount of solid waste particles contained in the solid waste slurry on a weight percent basis. This allows for the determination to be made of whether the liquid is suitable for redelivering to the sedimentation pond 12 for reuse and whether a sufficient amount of solid waste particles have been removed from the solid waste slurry.

Alternatively, the process may provide for allowing the solid waste particles to settle to the bottom area 36 of the tank 22, decanting the liquid from the tank 22 at the various levels above the bottom area 36 of the tank 22, followed by sampling of the liquid decanted from the tank 22 to determine the amount of solid waste particles contained in the solid waste slurry on a weight percent basis prior to stirring the solid waste slurry and discharging the same from the tank 22 into pump 40 as described herein. This would advantageously allow for the amount of solid waste particles contained in the solid waste slurry to be determined at an early stage of the treatment of the solid waste slurry. This may then be followed by initiating the stirring of the solid waste slurry and continuing the process as previously described herein.

The apparatus 10 may also include a service water supply 69 for delivering via lines 71 a supply of service water for flushing the various components of the apparatus 10, if and when desired. For example, valves 73 may be provided to allow the service water to flow into the bottom area 36 of the tank 22 to prevent pluggage at the bottom area 36 of the tank. In addition, valve 75 may be provided for flushing the collection chamber 39 and the lines 41 and 42 running between the collection chamber 39 and the pump 40. Similarly, valve 77 is provided for flushing the lines 43, as well as the lines downstream of the pump 40. This flush capability in conjunction with maintaining volumetric flow rates within the lines helps increase the efficiency of the process by preventing pluggage of the lines and the build-up of particles in the lines.

It will be appreciated, therefore, that the present invention has provided an effective process and apparatus for treatment of a solid waste slurry formed from solid waste particles mixed with a liquid. The treatment of the solid waste slurry is provided in a manner to effectively separate the solid waste particles from the liquid in order that the solid waste particles may be properly disposed in accordance with pertinent environmental laws and regulations. In addition, the process and apparatus of the invention provide for the treatment of the solid waste slurry in a cost-effective and economically feasible manner.

Whereas particular embodiments of the present invention have been described herein for purposes of illustration, it will be evident to those skilled in the art that numerous variations of the details may be made without departing from the invention as defined in the appended claims.

What is claim is:

1. A process for treatment of a solid waste slurry formed from solid waste particles mixed with a liquid, comprising the steps of:

delivering the solid waste slurry to first solid-liquid separation means for separating a first amount of the solid waste particles from the solid waste slurry;

delivering the solid waste slurry from said first solid-liquid separation means to a tank;

stirring the solid waste slurry contained within said tank to maintain the solid waste particle's in suspension;

discharging the solid waste slurry from said tank and into a pumping means;

recirculating by said pumping means a first portion of the solid waste slurry back to said tank;

discontinuing said stirring of the solid waste slurry within said tank and allowing the solid waste particles to settle to a bottom area of said tank;

decanting the liquid from said tank at a level above said bottom area of said tank, and wherein the solid wasted particles are a fossil fuel waste product.

2. The process of claim 1 including sampling and testing the liquid decanted from said tank to determine the amount of solid waste particles contained in the solid waste slurry on a weight percent basis.

3. The process of claim 2 wherein the size of the solid waste particles contained in the decanted liquid is in the range of about 15 to 75 microns.

4. The process of claim 2 including decanting the liquid from said tank at additional levels above said bottom area of said tank.

5. The process of claim 4 including sampling the liquid decanted from said additional levels of said tank to determine the amount of solid waste particles contained in the solid waste slurry on a weight percent basis.

6. The process of claim 1 wherein the solid waste slurry delivered to said first solid-liquid separation means comprises the solid waste particles in the range of about 5 to 40 weight percent of the solid waste slurry.

7. The process of claim 6 wherein the size of the solid waste particles in the solid waste slurry delivered to said first solid-liquid separation means is in the range of about 15 microns to 1.5 inches.

8. The process of claim 7 wherein
the size of said first amount of the solid waste particles separated in said first solid-liquid separation means is generally greater than 1/16 inch.

9. The process of claim 1 wherein
the volumetric flow rate of the solid waste slurry delivered to said first solid-liquid separation means is in the range of about 350 to 500 gallons per minute.

10. The process of claim 9 wherein
the volumetric flow rate of the solid waste slurry delivered to said tank from said first solid-liquid separation means is in the range of about 350 to 500 gallons per minute.

11. The process of claim 1 including
delivering by said pumping means a second portion of the solid waste slurry to second solid-liquid separation means for separating a second amount of the solid waste particles from the solid waste slurry.

12. The process of claim 11 wherein
the size of said second amount of the solid waste particles separated in said second solid-liquid separation means is generally greater than 15 microns.

13. The process of claim 1 including
adding a coagulant aid to the solid waste slurry.

14. The process of claim 1 including
delivering by said pumping means a second portion of the solid waste slurry for mixing with a combustion ash.

15. The method of claim 1 wherein
the solid waste particles comprise a combustion ash.

16. A process for treatment of a solid waste slurry formed from solid waste particles mixed with a liquid, comprising the steps of:
delivering the solid waste slurry to first solid-liquid separation means for separating a first amount of the solid waste particles from the solid waste slurry;
delivering the solid waste slurry from said first solid-liquid separation means to a tank;
allowing the solid waste particles to settle to a bottom area of said tank;
decanting the liquid from said tank at a level above said bottom area of said tank;
sampling and testing the liquid decanted from said tank to determine the amount of solid waste particles contained in the solid waste slurry on a weight percent basis;
discontinuing said decanting of the liquid from said tank;
stirring the solid waste slurry contained within said tank to maintain the solid waste particles in suspension;
discharging the solid waste slurry from said tank and into a pumping means;
recirculating by said pumping means a first portion of the solid waste slurry back to said tank, and wherein the solid waste particles are a fossil fuel waste product.

17. The process of claim 16 wherein
the size of the solid waste particles contained in the decanted liquid is in the range of about 15 to 75 microns.

18. The process of claim 16 including
decanting the liquid from said tank at additional levels above said bottom area of said tank.

19. The process of claim 18 including
sampling and testing the liquid decanted from said additional levels of said tank to determine the amount of solid waste particles contained in the solid waste slurry on a weight percent basis.

20. The process of claim 16 wherein
the solid waste slurry delivered to said first solid-liquid separation means comprises the solid waste particles in the range of about 5 to 40 weight percent of the solid waste slurry.

21. The process of claim 20 wherein
the size of the solid waste particles in the solid waste slurry delivered to said first solid-liquid separation means is in the range of about 15 microns to 1.5 inches.

22. The process of claim 21 wherein
the size of said first amount of the solid waste particles separated in said first solid-liquid separation means is generally greater than 1/16 inch.

23. The process of claim 16 wherein
the volumetric flow rate of the solid waste slurry delivered to said first solid-liquid separation means is in the range of about 350 to 500 gallons per minute.

24. The process of claim 23 wherein
the volumetric flow rate of the solid waste slurry delivered to said tank from said first solid-liquid separation means is in the range of about 350 to 500 gallons per minute.

25. The process of claim 16 including
discontinuing said stirring of the solid waste slurry within said tank and allowing the solid waste particles to settle to a bottom area of said tank; and
decanting the liquid from said tank at a level above said bottom area of said tank.

26. The process of claim 25 including
sampling the liquid decanted from said tank to determine the amount of solid waste particles contained in the solid waste slurry on a weight percent basis.

27. The process of claim 16 including
delivering by said pumping means a second portion of the solid waste slurry to second solid-liquid separation means for separating a second amount of the solid waste particles from the solid waste slurry.

28. The process of claim 27 wherein
the size of said second amount of the solid waste particles separated in said second solid-liquid separation means is generally greater than 15 microns.

29. The process of claim 16 including
adding a coagulant aid to the solid waste slurry.

30. The process of claim 16 including
delivering by said pumping means a second portion of the solid waste slurry for mixing with a combustion ash.

31. The method of claim 16 wherein
the solid waste particle comprise a combustion ash.

* * * * *

UNITED STATES PATENT AND TRADEMARK OFFICE
CERTIFICATE OF CORRECTION

PATENT NO. : 6,214,237 B1
DATED : April 10, 2001
INVENTOR(S) : Raymond J. Kustra et al.

It is certified that error appears in the above-identified patent and that said Letters Patent is hereby corrected as shown below:

Column 7,
Line 5, "solidliquid" should read -- solid-liquid --.

Column 10, claim 1,
Line 40, "wasted" should be -- waste --.

Column 12, claim 31,
Line 58, "particle" should be -- particles --.

Signed and Sealed this

Twenty-sixth Day of March, 2002

Attest:

*Attesting Officer*

JAMES E. ROGAN
*Director of the United States Patent and Trademark Office*